Oct. 4, 1960     E. KOPPELMAN     2,954,749
MACHINE FOR MANUFACTURING RUGS
Filed May 24, 1957     9 Sheets-Sheet 3
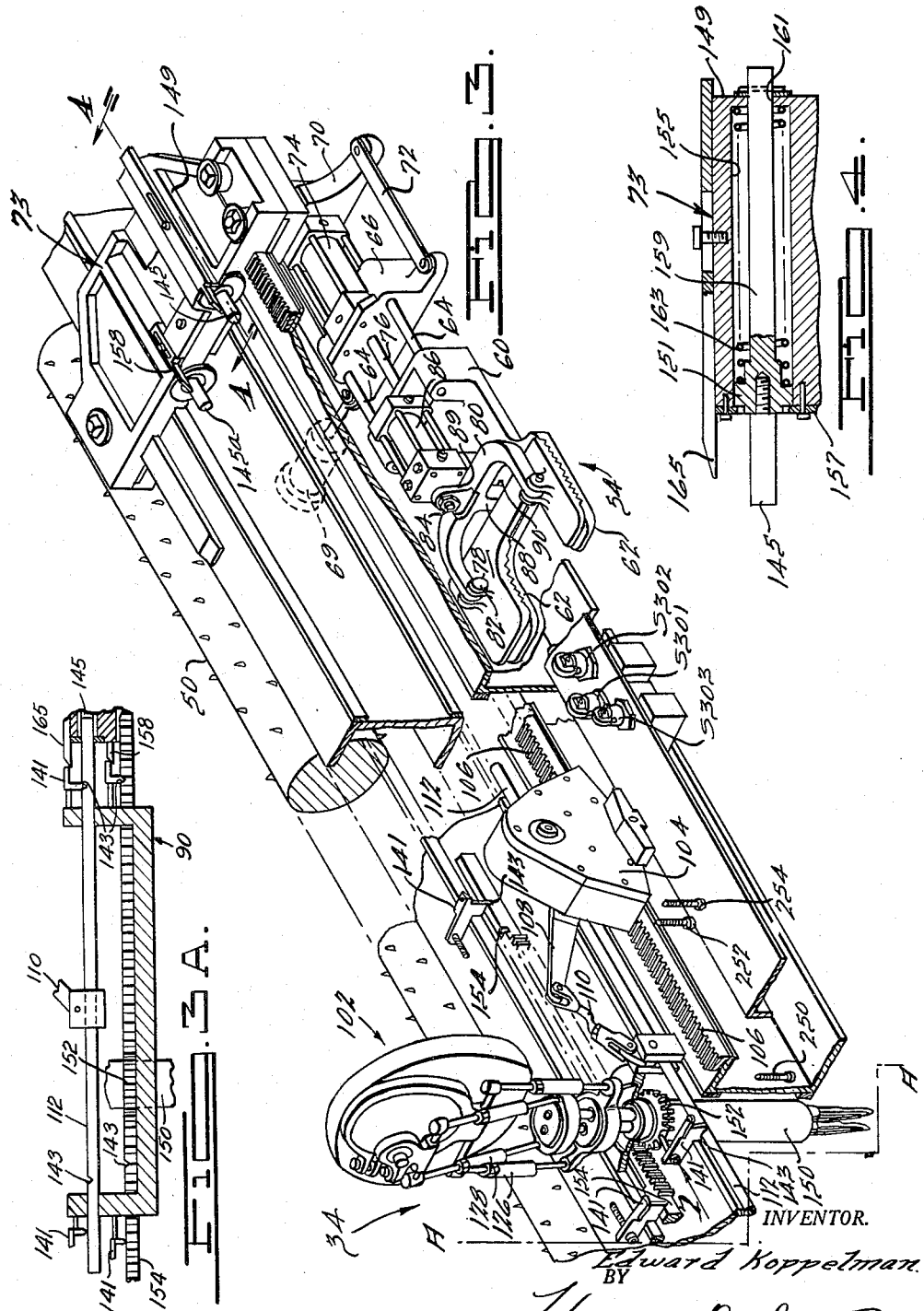
INVENTOR.
Edward Koppelman
BY
Barnes, Dickey & Pierce
ATTORNEYS.

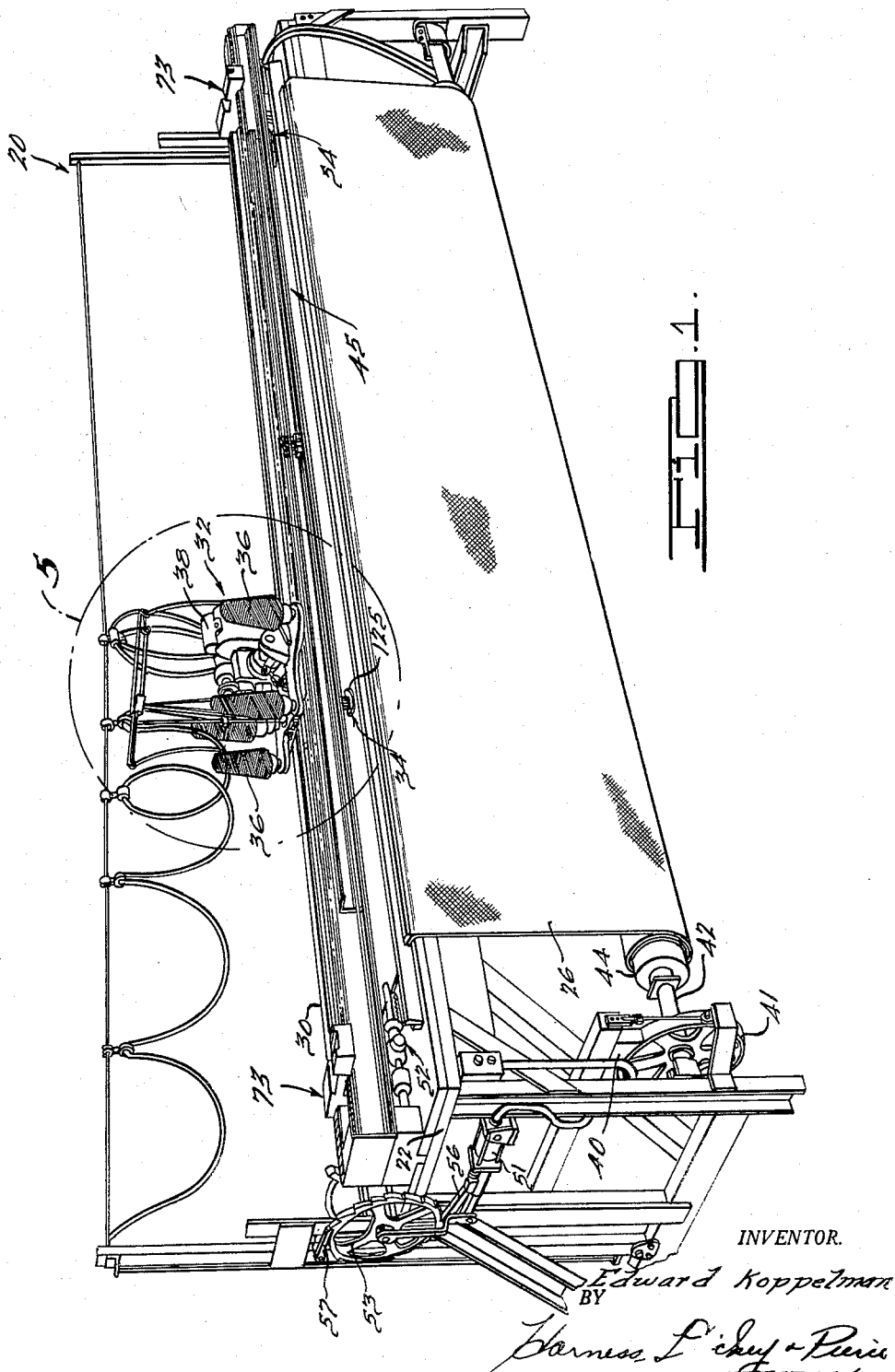

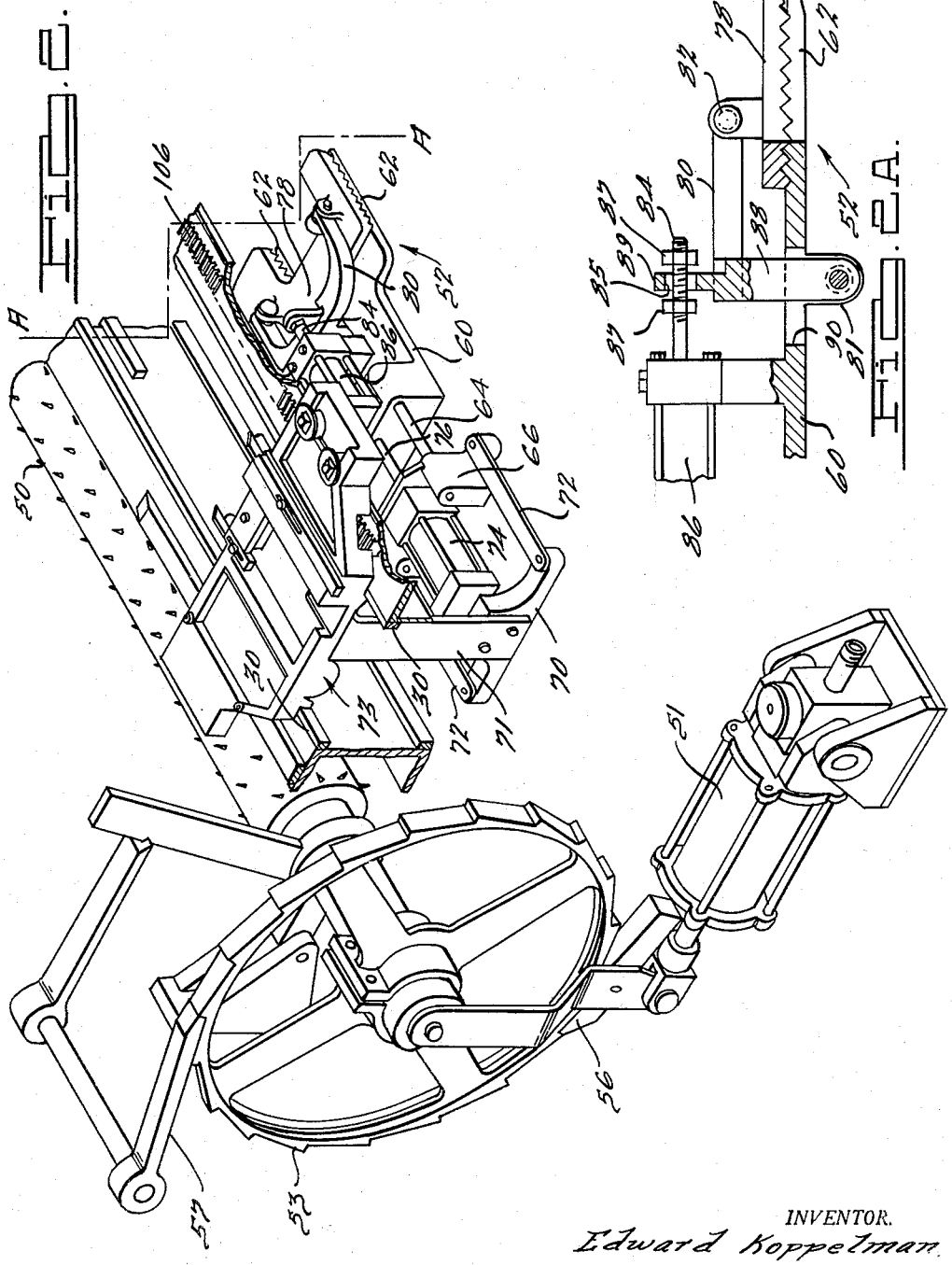

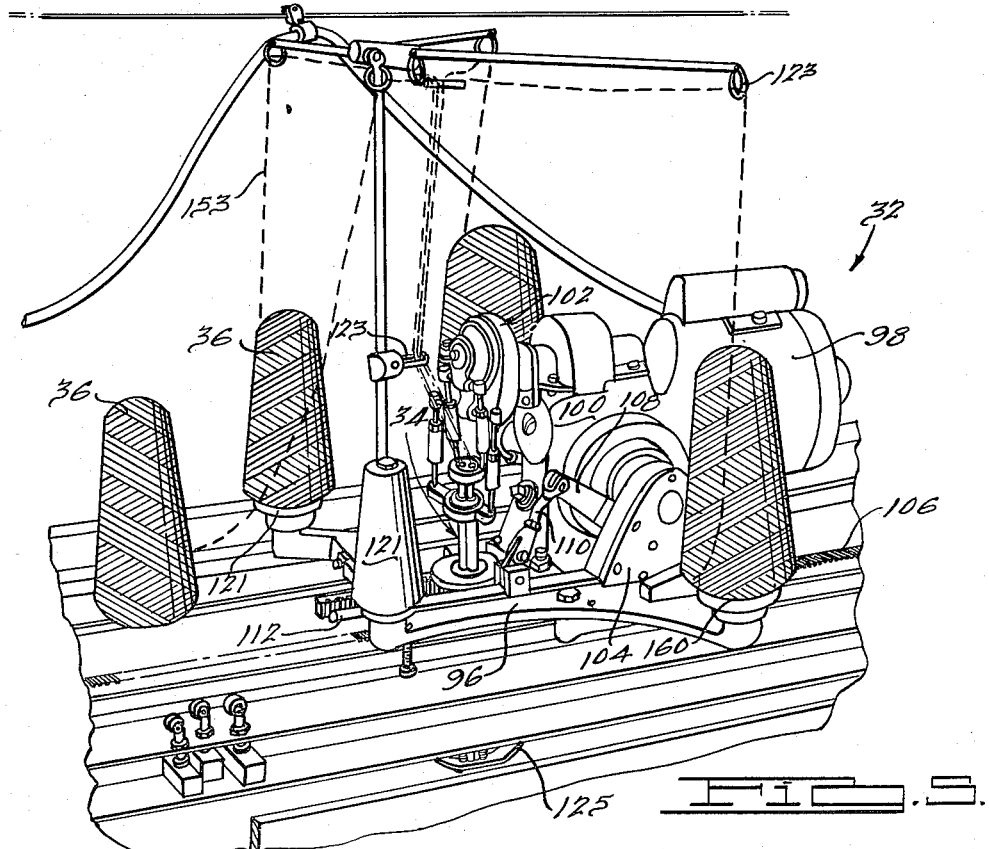
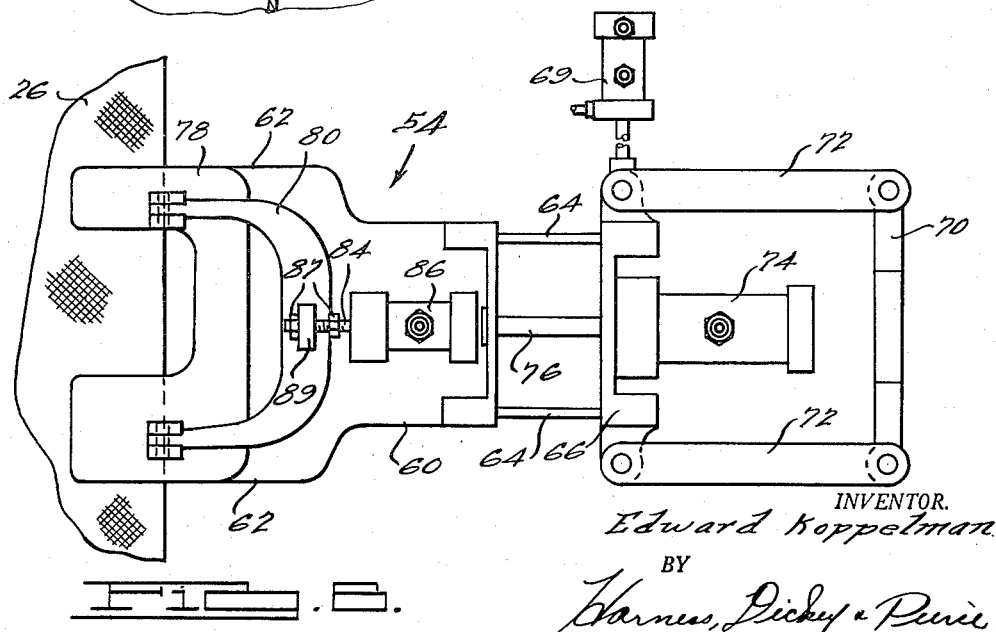

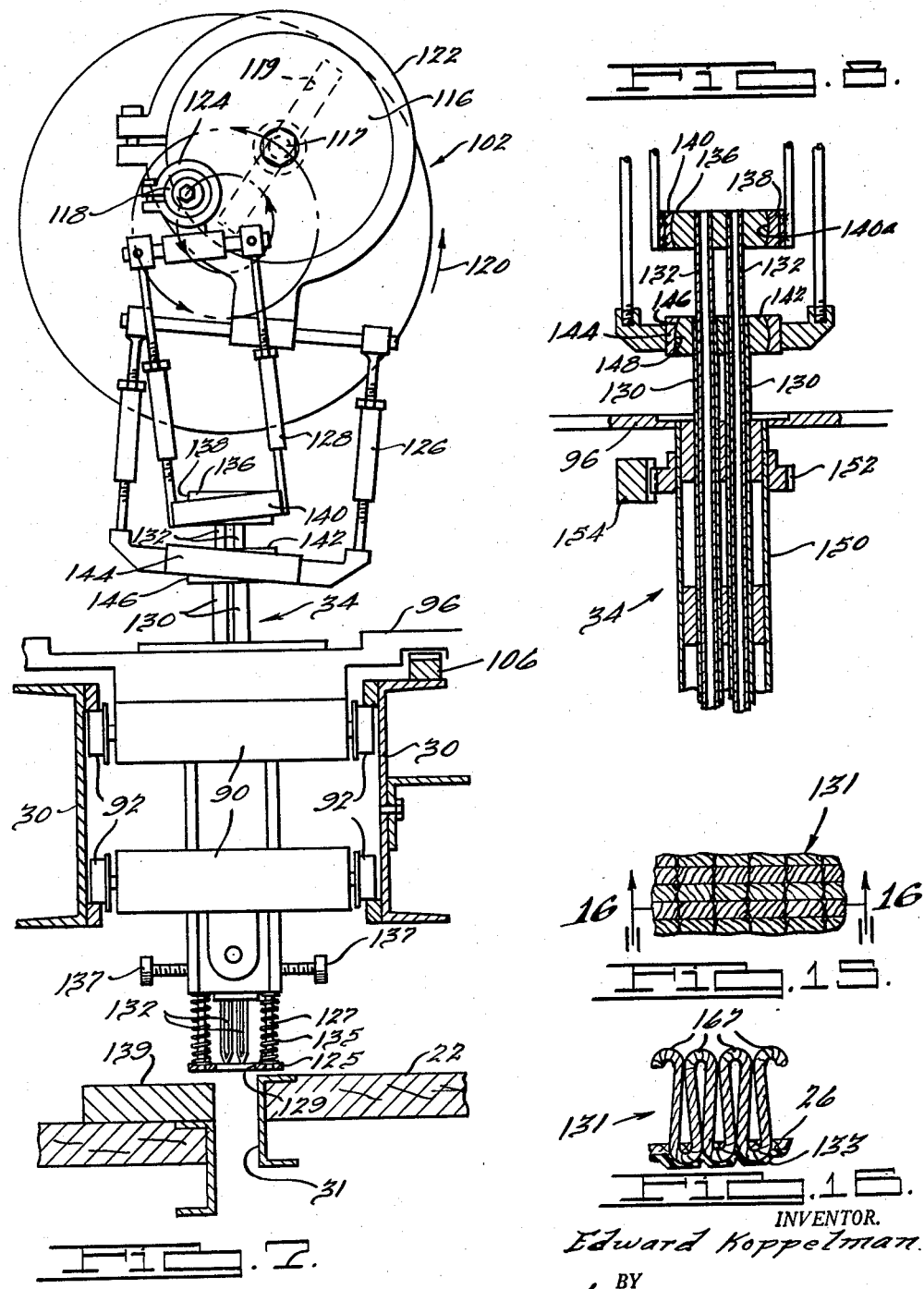

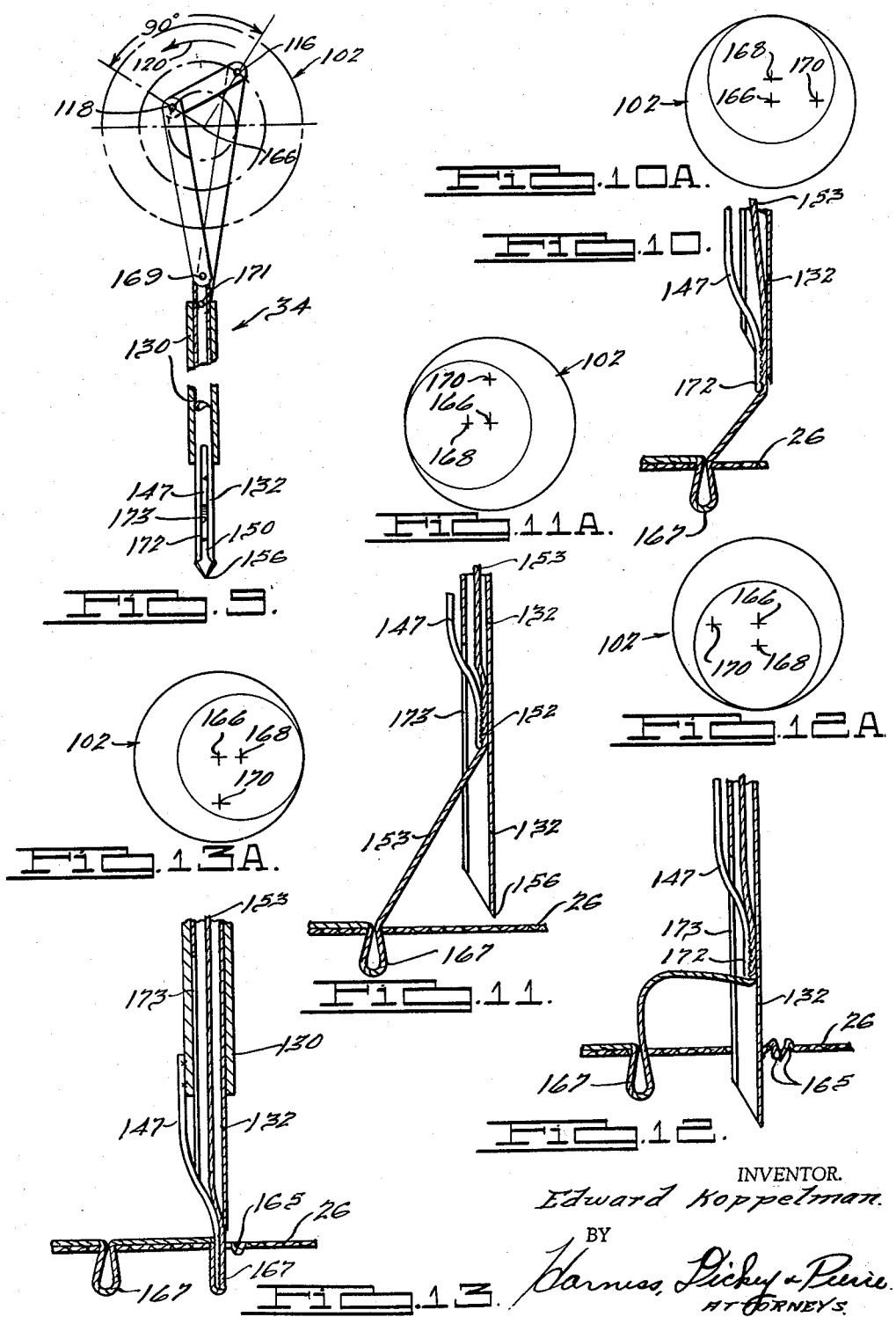

Oct. 4, 1960     E. KOPPELMAN     2,954,749

MACHINE FOR MANUFACTURING RUGS

Filed May 24, 1957     9 Sheets-Sheet 7

INVENTOR.
Edward Koppelman
BY
Harness, Dickey & Pierce
ATTORNEYS

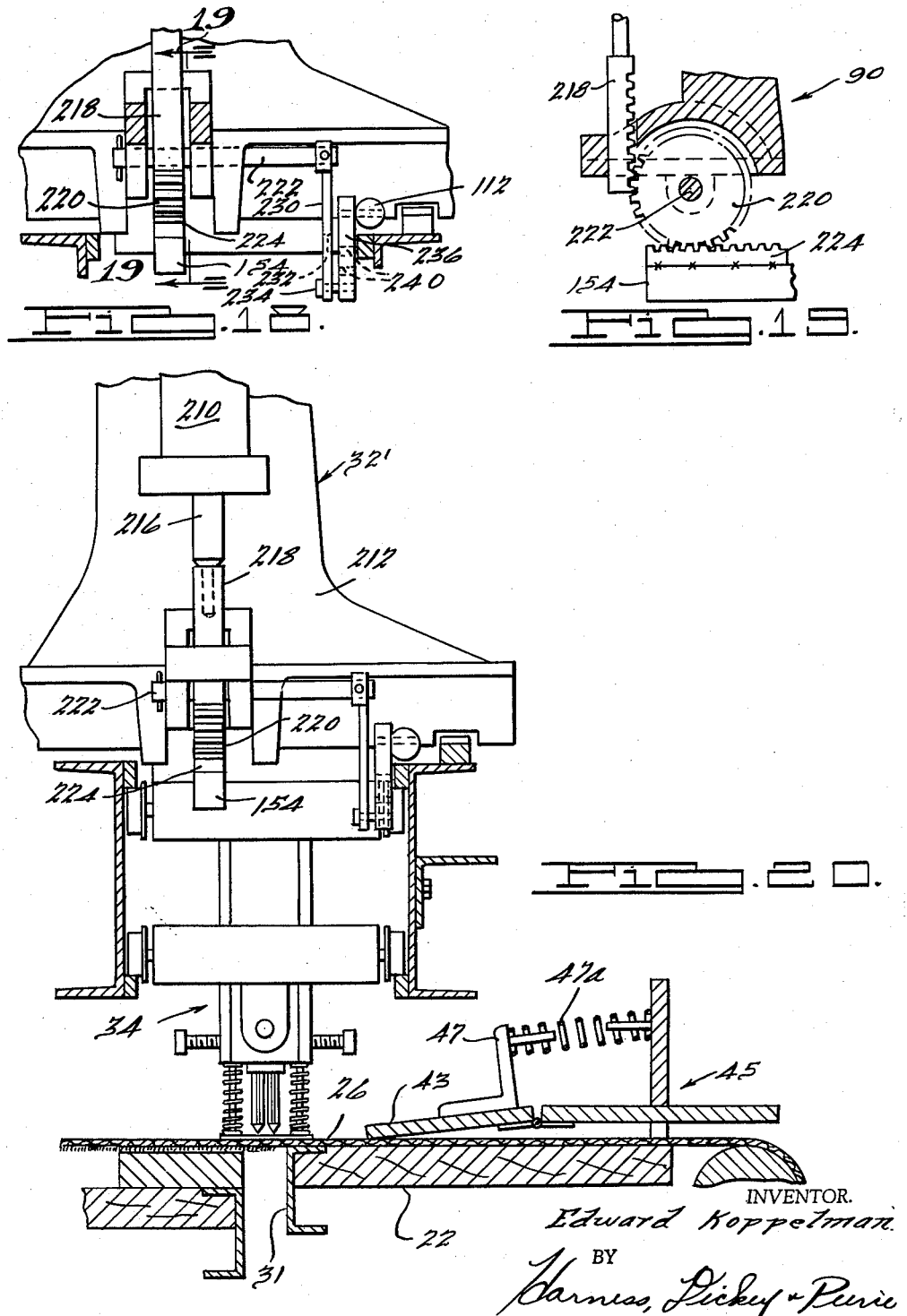

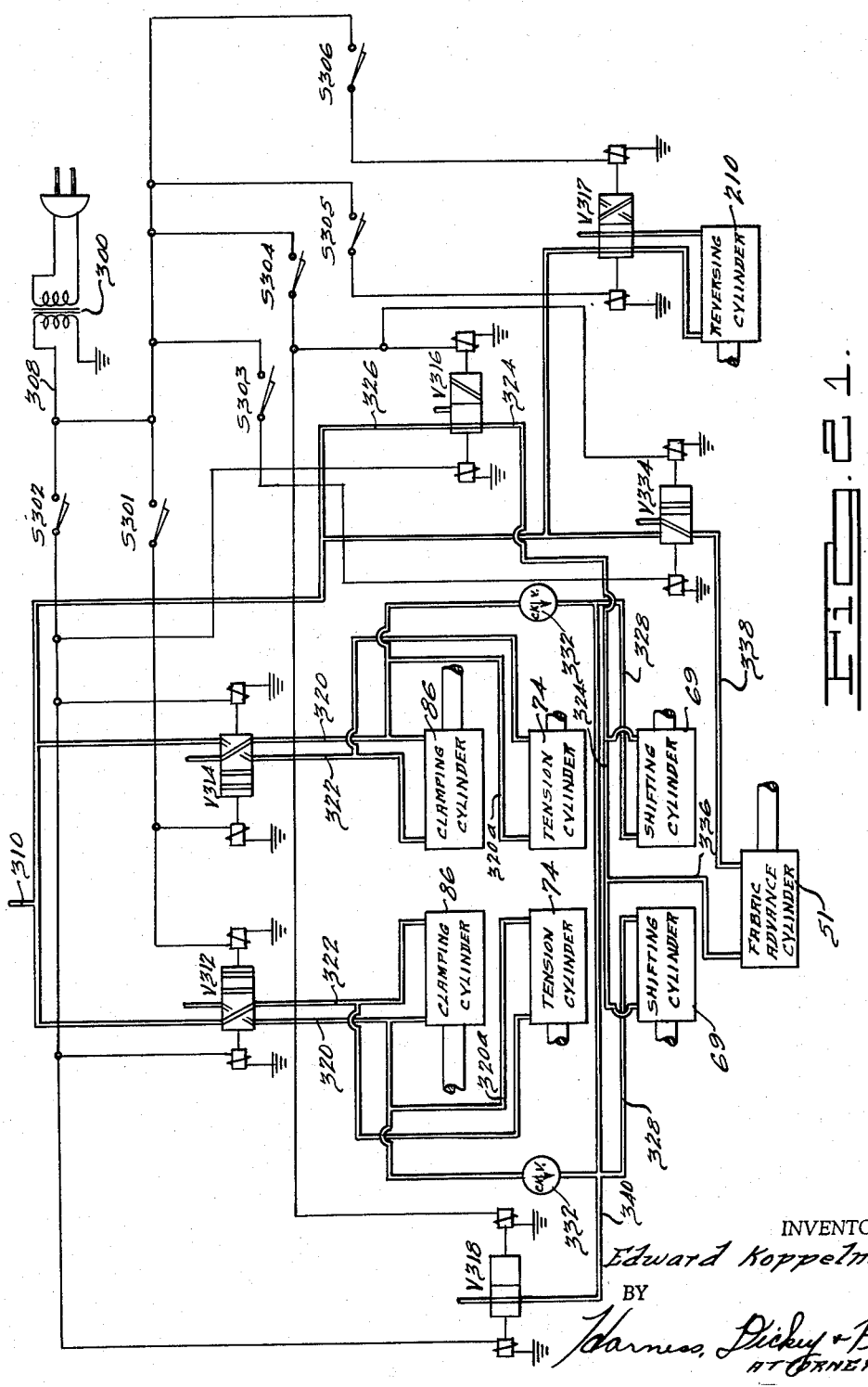

United States Patent Office 2,954,749
Patented Oct. 4, 1960

2,954,749
MACHINE FOR MANUFACTURING RUGS

Edward Koppelman, Huntington Park, Calif., assignor to 3-D Weaving Company, Huntington Park, Calif., a partnership Filed May 24, 1957, Ser. No. 661,335

22 Claims. (Cl. 112—79)

This invention relates to improved apparatus for making rugs, carpets and the like, and more particularly to improved apparatus for making rugs and carpets of the type having looped or pile filling.

Apparatus according to the invention is especially adapted for the manufacture of rugs and carpets of the type made by passing yarn through a web of canvas or duck to form loops of the yarn extending on one side of the web. Such rugs and carpets have heretofore been made largely by methods involving a relatively high proportion of skilled hand labor. For example, many rugs are still made entirely by hand, bits of yarn being tediously tied individually to the web backing by patient artisans. In some instances, the filling loops may be inserted in the web backing by power-actuated needles mounted in a gun-like frame which is manually held and traversed across the web backing. Even this method is relatively expensive and requires a relatively high degree of skill to keep the lines straight and the loops evenly spaced one from another.

Accordingly, one important object of the present invention is to improve rug and carpet-making apparatus. Another, more specific object is to provide improved rug and carpet-making apparatus capable of continuous operation for automatically inserting filling loops of yarn in a web backing.

These and other objects are accomplished by the present invention, one embodiment of which comprises a machine having a table upon which a web backing may be stretched. A carriage carrying loop-making needles and a supply of yarn is mounted upon ways extending along and spaced above the table, and is drivable along the length of the table, across the width of the web. As the carriage traverses the web, the needles are continuously reciprocated vertically, inserting the yarn through the web to form spaced carpet loops thereon. Means are provided to tension the web both longitudinally and transversely, so that it is held taut during insertion of the carpet loops. The apparatus includes control means to coordinate the operation of the tensioning means with the travel of the carriage, as hereinafter described, and means to automatically reverse the direction of travel of the carriage and the orientation of the needles when the carriage reaches the ends of the table.

The invention will now be described in greater detail in connection with the accompanying drawings of which:

Figure 1 is a perspective view of a rug-, or carpet-making machine according to a first embodiment of the invention;

Fig. 2 is a partly schematic, isometric view of a portion of the machine shown in Fig. 1, certain parts thereof being broken away for greater clarity;

Fig. 2A is a longitudinal section of the jaw assembly of the machine shown in Fig. 2;

Fig. 3 is a partly schematic, isometric view of another portion of the machine shown in Fig. 1, again with certain parts being broken away, this figure taken together with Fig. 2 consituting a single view of the entire machine broken along the lines A—A;

Fig. 3A is a fragmentary longitudinal sectional view showing details of the carriage reversing mechanism of the machine;

Fig. 4 is a longitudinal section of a portion of the machine as shown in Fig. 3, taken along the section line 4—4 thereof;

Fig. 5 is a perspective view of the carriage of the machine shown in Fig. 1, being an enlarged view of the portion of Fig. 1 enclosed within the circle 5;

Fig. 6 is a plan view of a portion of the machine shown in Fig. 1, particularly showing the web clamping jaw assembly at one end of the machine;

Fig. 7 is a diagrammatic elevational view partly in section of the machine as shown in Fig. 3, viewed in the direction of the arrow 7 thereof certain parts being omitted for the purpose of clarity;

Fig. 8 is a fragmentary cross-sectional view of the carriage, showing details of the loop inserting needles and associated structure;

Fig. 9 is a schematic, elevational view, partly in section of the needle drive mechanism of the machine, particularly showing the timing relationship in the needle drive mechanism;

Fig. 10 is a schematic, longitudinal section of the lower portion of the loop-inserting needles, showing the needles in a first operative position during operation of the machine;

Fig. 10A is a schematic diagram showing the position of the needle drive member corresponding to the position of the needles as illustrated in Fig. 10;

Fig. 11 is a schematic longitudinal section of the lower portion of the loop-inserting needles, showing the needles in a second operative position during operation of the machine;

Fig. 11A is a schematic diagram showing the position of the needle drive member corresponding to the position of the needles as illustrated in Fig. 11;

Fig. 12 is a schematic longitudinal section of the lower portion of the loop-inserting needles showing the needles in a third operative position during operation of the machine;

Fig. 12A is a schematic diagram showing the position of the needle drive member corresponding to the position of the needles as illustrated in Fig. 12;

Fig. 13 is a schematic longitudinal section of the lower portion of the loop-inserting needles showing the needles in a fourth operative position during operation of the machine;

Fig. 13A is a schematic diagram showing the position of the needle drive member corresponding to the position of the needles as illustrated in Fig. 13;

Figure 17:
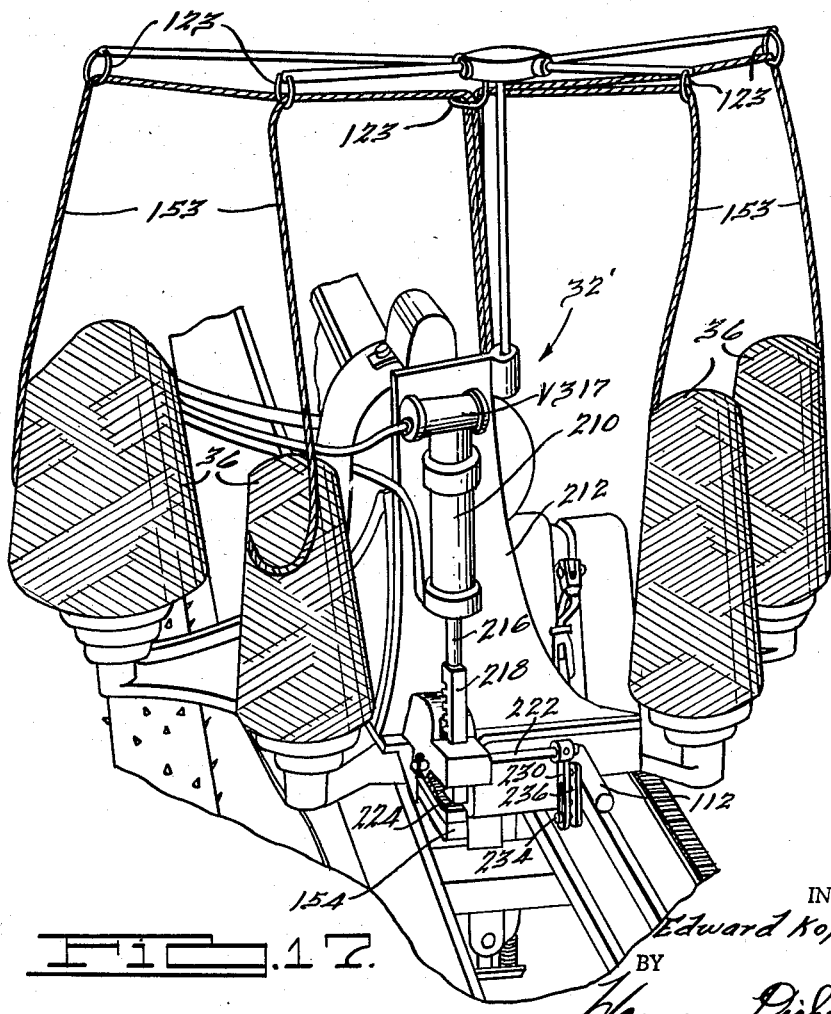

Fig. 15, which appears on Sheet 5, is a fragmentary plan view of a carpet woven on the machine illustrated in the preceding figures;

Fig. 16, also on Sheet 5, is a cross section of the carpet fragment shown in Fig. 15, taken along the section line 16—16 thereof;

Fig. 17 is a perspective view of a rug-looping carriage assembly according to a second embodiment of the invention adapted to be mounted on the machine ways in place of the carriage assembly shown in Fig. 5, and including power actuated needle and carriage drive reversing means;

Fig. 18 is a partly schematic cross-sectional view of a portion of the carriage shown in Fig. 17, particularly showing details of the needle and carriage drive reversing mechanism thereof;

Fig. 19 is a longitudinal sectional view of the structure shown in Fig. 18, taken along the section line 19—19 thereof;

Fig. 20 is a partly schematic cross-sectional view of a rug-making machine according to the invention, showing the carriage illustrated in Fig. 5 in front elevation; and Fig. 21 is a schematic circuit diagram of an electrical and pneumatic control system adapted for automatic control of the rug-making machine shown in the preceding figures and including a power-actuated reversing mechanism such as shown on the carriage illustrated in Fig. 17.

A rug and carpet-making machine 20 according to a first embodiment of the invention and as illustrated in Figs. 1, 2 and 3 comprises an elongated table 22 having a central, longitudinal slot 31 (Fig. 7) therein, and adapted to provide a flat supporting surface for a rug backing web 26 such as a canvas fabric trained over it. Ways 30 are supported over the table 22 in alignment with the slot 31, and a carriage 32 is mounted upon the ways for reciprocating travel along the table. A loop-forming needle assembly 34 and cones 36 of yarn, together with a drive motor 38 and appropriate interconnecting means are mounted upon the carriage 32 for travel therewith. As the carriage travels back and forth on the ways 30, the needle assembly 34 is operated to insert spaced carpet loops in the web 26.

The general mode of operation of the machine 20 will be described first to facilitate an understanding of the subsequent description of the detailed construction of the machine. The web 26 is tensioned both longitudinally and transversely. Transverse tensioning (all the directions herein being taken with respect to the table 22, the length of which is considered to be its longest dimension) may be accomplished by conventional means such as a friction shoe 40 spring urged against a brake wheel 41 fixed at one end of the shaft 42 upon which the web let-out roll 44 is mounted. Preferably, however, as most clearly shown in Fig. 20 (Sheet 8) a supplemental transverse tensioning shoe 43 is mounted above the table 22 as closely as possible to the slot 31. This shoe 43 is horizontally hinged upon a supporting beam 45 which spans the table longitudinally and under which the web 26 is trained. The shoe 43 extends substantially the full length of the table 22 and is urged downwardly toward the table 22 by a plurality of longitudinally spaced springs mounted between the beam 45 and brackets 47 fixed on the shoe. The supplemental tensioning shoe 43 may be used either alone or in conjunction with a conventional brake wheel arrangement as desired.

The web 26 is drawn over the table 22, between the table and the shoe 43, and is gripped at the far side of the table by a pin type take-up roll 50, which is rotated to advance the web and to tension it against the retarding force exerted by the shoe 43.

Longitudinal tensioning is accomplished by two clamping jaw assemblies 52 and 54 which are adjustably mounted at opposite ends of the table 22, resting thereon, and grip the edges of the web 26. These jaw assemblies 52 and 54 are movable a limited distance transversely across the table with the web 26, and are actuatable by pneumatic cylinder assemblies as described in greater detail hereinafter.

As the carriage 32 travels back and forth on the ways 30, the needle assembly 34 is continuously operated to insert closely spaced yarn loops in the web 26. The needle assembly 34 operates first to penetrate the web 26, and then to draw down a length of yarn through the web to make a carpet loop, repeating the process rapidly as the carriage 32 travels along the ways 30. When the carriage 32 reaches the edge of the web 26, its direction of travel is reversed and simultaneously the web 26 is advanced a distance equal to the spacing desired between successive rows of loops. The jaw assemblies 52 and 54 travel with the web 26 at the time it is advanced. When the carriage reaches the middle of the table, the jaw assemblies 52 and 54 are operated to release the web momentarily, and to regrip it at a new location a little farther back in preparation for the next advance. Thus, satisfactory tension is maintained on the web 26 at all times during operation of the machine 20. Machines according to the invention are capable of making looped rugs and carpets at a vastly greater rate than previous, manually operated and guided rug and carpet looping machines.

The web 26 is advanced by intermittent rotation of the take-up roll 50, under which it is trained. The roll 50 is driven by a pneumatic or hydraulic cylinder 51 through a ratchet wheel 53 fixed on the shaft of the take-up roll 50. The cylinder 51 is arranged to reciprocate a driving pawl 56 to advance the wheel 53, and the wheel is held against reverse rotation by a holding pawl 57. The spacings between the teeth of the ratchet wheel 53 are selected according to the spacings desired between successively formed rows of carpet loops, being made larger for widely spaced rows and smaller for closely spaced rows.

*Web tensioning jaw assemblies*

The web 26 is advanced each time the carriage 32 reaches the end of a row and reverses its direction of travel, and the jaw assemblies 52 and 54 hold fast to and travel with the web when it is advanced. Thus, full longitudinal tension is maintained on the web 26 when the loops are being inserted therein near its edges. When the carriage approaches the center of the web, the jaw assemblies 52 and 54 momentarily release the web 26, and are swung backwards and then immediately regrip the web in a new location and place it again in full longitudinal tension. The backward shifting of the jaw assemblies 52 and 54 takes place when the carriage 32 is about at the middle of the ways 30, and the momentary release of the web 26 at this time does not significantly affect the operation of the loop-inserting needles, since the transverse tension on the web and its own stiffness are sufficient to maintain uniform loop characteristics near the center.

Referring now to Figs. 2, 2A, 3 and 6 wherein are best shown the detailed structure and mounting means for the jaw assemblies 52 and 54, each one of the jaw assemblies 52 and 54 comprises a base plate 60 having a pair of forwardly extending arms 62, the upper surfaces of which are serrated for gripping engagement with the web 26. The base plate 60 rests slidably upon the surface of the table 22 and is guided for longitudinal travel along the table upon a pair of guide pins, or rods 64. These guide rods 64 are fixed in and project from a bracket member 66, which also rests upon the table 22, and which is connected to a rigid, adjustably fixed support 70 by a pair of pivoted parallelogram arms 72. The support 70 is rigidly secured through a depending bracket 71 to a stop member 73, which is adjustably fixed upon the ways 30. The stop member 73 may be moved along the ways 30 to any desired position according to the width of the web 26 to position the jaw assembly 52 or 54 for tensioning a web of any width within the limits of the over-all length of the table 22. The stop member 73 also includes means cooperable with the carriage 32 to reverse the carriage travel when the carriage approaches the edge of the web 26 as described hereinafter.

The forward portion of the jaw assembly 52 or 54, including the base plate 60 and the bracket member 66 is reciprocable across the table in line with the travel of the web 26. The arms 72 form a parallelogram with the bracket member 66 and the support 70 so that the base plate 60 is maintained in alignment with the table 22 at all times. A fluid motor, which may be a conventional pneumatic cylinder 69 is connected between the table 22 and the bracket member 66 to controllably reciprocate the jaw assembly 52 or 54 across the table. This cylinder 69 will be hereinafter referred to as the shifting cylinder.

A second pneumatic cylinder 74 is rigidly mounted on the bracket member 66 and its piston rod 76 is connected to the base plate 60. This pneumatic cylinder 74, which may be called the tension cylinder, is controlled through a conventional four-way valve (not shown) for positive reciprocating longitudinal drive of the base plate 60.

A U-shaped upper plate 78 is trunnioned upon the forward, or open end of a yoke 80, and is positioned directly over the forwardly projecting arms 62 of the base plate to cooperate therewith to grip the web 26. The lower surface of the plate 78 is preferably serrated similarly to the upper surfaces of the arms 62 for positive gripping of the web. A pivot arm 88 is rigidly secured to the base portion of the yoke 80, extending downwardly therefrom through a slot 90 in the base plate 60, and is pivotally secured to a downwardly projecting bracket 81 (shown in Fig. 2A) fixed upon the base plate 60. The yoke 80 is swingable to raise and lower the upper plate 78 by means of a third pneumatic cylinder 86, which may be called the clamping cylinder, and which is rigidly secured to the base plate 60. The piston rod 84 of the clamping cylinder 86 extends loosely through a vertical slot 85 in an upstanding bracket 89 fixed on the base portion of the yoke 80, and stop nuts 87 are fitted on the piston rod 84 on both sides of the bracket 89. Thus the clamping cylinder 86 is connected to swing the yoke 80 to raise and lower the upper plate 78 without binding between the piston rod 84 and the bracket 89.

The clamping cylinder 86 is also connected through a four-way valve (not shown) to a source of compressed fluid for positive drive in both its advancing and retracting directions. When the cylinder 86 is energized in its advancing direction, it drives the bracket 89 forwardly, pivoting the yoke 80 about its pivot axis to force the plate 78 into tight pressure engagement against the arms 62 of the base plate. When the cylinder 86 is retracted, it pivots the yoke 80 in the opposite direction to lift the plate 78 away from the arms 62.

In operation, the action of the jaw assemblies 52 and 54 is coordinated with the travel of the carriage 32. Normally, the web 26 is firmly held between the arms 62 and the plate 78, and the tension cylinders 74 are energized in their retracting direction to tension the web 26 along the length of the table 22. When the carriage 32 reaches either one of the stop members 73, the web 26 is advanced as hereinafter described, and the jaw assemblies 52 and 54 are advanced with the web by means of the shifting cylinders 69, maintaining full tension upon it. The stroke of the shifting cylinders 69 is adjusted to be equal to the advance of the web 26 on each step. When the carriage 32 approaches the middle of the table, the clamping cylinders 86 are retracted to raise the plates 78 to release the web 26. As soon as the web 26 is released, the shifting cylinders 69 are reversed to drive the jaw assemblies 52 and 54 backwardly to their starting positions. Also, immediately after the web 26 is released, the tension cylinders 74 are actuated to advance the base plates 60 towards each other along the table 22. After the base plates 60 are driven backwardly (with respect to the web advancing direction) and advanced towards each other, the clamping cylinders 86 are reversed to drive the upper plates 78 toward the arms 62 to grip the web 26 again, this time in a new location. After the clamping cylinders 86 have been advanced to grip the web, the tension cylinders 74 are reversed to retract the base plates 60, again to place the web 26 under tension. This complete sequence is repeated each time the carriage 32 passes the center of the table 22.

Carriage

The carriage 32 in the embodiment illustrated in Figs. 1, 3 and 5 comprises a body member 90 (Fig. 7) which may be, for example, a casting of I cross section. Rollers 92 are mounted along the edges of the body 90 to guide the carriage smoothly within the ways 30. A supporting plate 96 is affixed atop the body 90 for mounting the various operating components of the carriage. These components include a drive motor 98 which is connected to the input of a gear box transmission 100. A needle drive wheel 102 is rotatably mounted upon the transmission 100 and driven through one output thereof. A reversible carriage drive gear assembly 104 fixed upon the plate 96 is also driven from the transmission 100. The gear assembly 104 includes a pinion gear (not separately shown) for engaging a rack 106 fixed to the table 22 adjacent to the ways 30 and thereby driving the carriage 32 along the ways 30. The gear assembly 104 may be of conventional construction, and is of the reversible type for selectively driving the carriage in either direction. Reversal of drive is accomplished by angular movement of a gear shift lever 108 which extends from the gear assembly 104 and is connected at its outer end through a toggle link 110 to a longitudinally reciprocatable reversing bar 112 mounted in the body 90. Movement of the bar 112 from one position to another, actuates the lever 108 through the toggle link 110 to reverse the direction of travel of the carriage 32.

A pressure shoe member 125 for smoothing the web 26 is supported beneath the body 90 upon a pair of rods 127, which extend slidably into the body 90. This shoe member 125 includes a central aperture 129 (Fig. 7) which is aligned with the needle assembly 34 and within which the needles operate. The shoe 125 is urged downwardly toward the table 22 by a pair of compression springs 135 fitted around and guided by the rods 127. The rods 127 carry radial flanges (not shown) at their upper ends which abuttingly engage a pair of fixed stop screws 137 to limit the downward travel of the shoe 125.

Spindles 121 are mounted upon the plate 96 for carrying the cones 36 of yarn. Illustratively, there are shown four spindles 121, but it will be readily appreciated that any desired number of these spindles may be accommodated depending upon the type of rug to be made. In the instant case, the carriage 32 is constructed to accommodate four cones 36 of yarn 153, which is trained through guides 123 to the needle assembly 34.

The rear portion of the table 22, i.e., the portion between the slot 31 and the take-up roll 50 is depressed below the level of the forward portion to accommodate the loops laid in the web 26 by the needle assembly 34. A filler bar 139 is placed on the rear portion of the table 22, immediately to the left of the slot 31 as viewed in Fig. 7 to keep the web 26 even and flat under the shoe 125. The height of the filler bar 139 is selected according to the height and density of the loops placed in the web 26.

Carriage reversing operation

Reversing of the carriage drive gear assembly 104 and of the needle assembly 34 in this embodiment of the invention is accomplished by a spring-loaded tripping arrangement most clearly shown in Figs. 3 and 4. The arrangement is symmetrical at the two ends of the table 22 and will therefore be described herein only in connection with the right-hand end of the machine as viewed in Fig. 3. The gear reversing bar 112 and the needle reversing rack 154 are slidably mounted in opposite sides of the carriage body 90, and project from the body forwardly in the direction of travel thereof. They are held in place by spring biased latch dogs 141 which are positioned to fall into notches, or kerfs 143 formed in the bar 112 and the rack 154. The latch dogs 141 are pivoted upon the body 90, and are spring urged toward the rod and the rack and into the noches 143 to restrain the bar 112 and the rack 154 against longitudinal travel in the body 90, thereby locking the gear assembly 104 and the needle assembly 34 in position.

Spring-loaded actuating plungers 145 and 145a are mounted within cylinder portions 149 in the stop members 73 in alignment with the bar 112 and the rack 154, respectively. As shown in Fig. 4, the plunger 145 (the plunger 145a being identical thereto) is secured to a piston 151 slidably fitted within the bore 155 of the cylinder portion 149. The forward travel of the piston 151 is limited by an annular base plate 157 which closes the forward end of the bore 155 and through which the plunger 145 extends. The piston 151 is secured to, and may be formed integrally with a shaft 159, which extends rearwardly through an aperture 161 in the rear wall of the cylinder portion 149 and serves as a follower for a compression spring 163. This spring 163 is seated between the piston 151 and the rear wall of the cylinder portion 149 to urge the piston 151, together with the plunger 145, forwardly. A knife-like cam 165 is adjustably mounted upon the support 149 directly above the plunger 145, and projects forwardly toward the carriage 32. This cam 165 is positioned to be engaged by one of the latch dogs 141 when the carriage 32 nears the support 149, driving the latch dog upwardly out of the notch 143 in which it is seated.

In operation, when the carriage 32 approaches the stop member 73, the reversing bar 112 and the rack 154 abuttingly engage the plungers 145 and 145a, respectively, and drive them into the bores 155, compressing the springs 163. The carriage 32 continues to advance, further compressing the springs 163 until the latch dogs 141 are brought into engagement with the cams 165 and forced upwardly thereby out of the notches 143 to release the bar 112 and the rack 154. The bar 112 and the rack 154 are then driven forcibly and rapidly to their reverse positions by expansion of the springs 163, and are again locked by latch dogs 141 at the opposite end of the body 90. The carriage 32 thus is driven automatically back and forth along the ways 30, and continues its travel without externally applied controls as long as the motor 38 continues to operate.

*Needle assembly*

Referring now to Figs. 7, 8 and 9, two eccentrically mounted bosses 116 and 118 project from the face of the needle drive wheel 102. These bosses 116 and 118 are angularly spaced about 90° apart, and the angularly following boss 116 (the direction of rotation being counterclockwise as indicated by the arrow 120) is radially offset a greater distance from the center of the wheel 102 than the leading boss 118. The following boss 116 is preferably made adjustable in its radial position on the wheel 102 to permit ready adjustment of the height of the loops 167 placed in the web 26 according to the principles hereinafter described. For this purpose, the following boss 116 may, for example, be secured to the wheel 102 by a bolt 117 extended through a radial slot 119 in the wheel 102 and secured by a nut (not shown) at the rear face of the wheel, as indicated in Fig. 7.

Slip rings 122 and 124 are mounted upon the bosses 116 and 118, respectively, and yokes 126 and 128 of adjustable length are suspended from the respective slip rings 122 and 124 for translating the rotary motion of the bosses 116 and 118 into vertical motion to drive the needle assembly 34.

The needle assembly includes a pair of tubular piercing needles 132 which are fixed to and extend through a supporting disc 136 driven by the yoke 128 that is attached to the leading boss 118. The disc 136 is rim supported within a collar 140 fixed at the lower end of the yoke 128. The rim 138 of the disc and the inner circumferential surface 140a of the collar are spherically curved upon substantially the same radius so that the disc 136 is vertically fixed with respect to the collar 140, yet is freely slidably rotatable within the collar, and the collar 140 is free to rotate with the yoke 128 through a vertical angle without stressing or releasing the disc 136. The disc 136 and the collar 140 are preferably made of materials having advantageous low friction characteristics, such as bronze and steal, respectively, to facilitate free sliding movement between them and to minimize the need for lubricants, which might accidentally come into contact with and soil the yarn.

The piercing needles 132 extend downwardly from the disc 136 and are slidably fitted within guide sleeves 130, which are similarly mounted in a second disc 142 supported within a collar 144 at the lower end of the yoke 126. The rim 146 of the sleeve supporting disc 142 is convexly curved similarly to the rim 138 of the piercing needle disc, and the inner surface 148 of the collar 144 is curved on the same radius and in the same direction to the receive the rim 146.

This arrangement permits positive vertical drive of the piercing needles 132 and the sleeves 130 by the needle drive wheel 102 through the yokes 126 and 128 and the collars 140 and 144. It also permits free rotational travel of the discs 136 and 142 within their respective collars 140 and 144, and allows the yokes 126 and 128 to swing freely in a vertical plane to follow the rotation of the needle drive wheel 102 without imposing a twisting or bending stress on the needles or sleeves.

Loop-forming needles 147 are welded or otherwise secured at the lower ends of the sleeves 130 and extend downwardly into the piercing needles 132 through longitudinal slots 173 formed in the walls thereof. The loop-forming needles 147 are preferably made of a resilient material such as spring steel or Phosphor bronze, and their tips 172 are bent inwardly to bear lightly against the inner walls of the piercing needles 132. The tips 172 of the loop-forming needles may, if desired, be slightly roughened, or transversely serrated to facilitate the yarn feed action, which action is accomplished by relative vertical movement of the loop-forming needles with respect to the piercing needles, the yarn 153 being trained through the piercing needles and being lightly gripped between the tips 172 of the loop-forming needles and the walls of the piercing needles.

The piercing needles 132 are guided for smooth vertical travel by the sleeves 130. The sleeves 130, in turn, are slidably fitted within a guide shaft 150 which is rotatably mounted upon the plate 96 and extends downwardly through the body 90. A spur gear 152 is fixed upon the shaft 150 coaxially therewith, and is engaged by the rack 154 which is slidably mounted for reciprocating travel in the body 90. In operation, the rack 154 is longitudinally reciprocated between two extreme positions to reciprocate the needle assembly 34 through 180° of arc. As perhaps best shown in Fig. 9, the piercing needles 132 are chisel pointed, being hollow tubes cut at an acute angle to their axes. In order to facilitate insertion of the yarn loops, the tips 156 of these needles 132 are oriented toward the direction of travel of the carriage 32. When the carriage travel is reversed, the reversing rack 154 is shifted from one extreme position to the other as hereinabove described to reorient the needle assembly 34 toward the new travel of direction.

*Needle operation*

For commercially satisfactory operation, the needle assembly must be capable of piercing a fabric backing such as the web 26 (Fig. 1) and inserting a yarn through the backing to form a loop on the side opposite from the needles. It is also desirable to provide means to adjust the loops to any desired height, and the mechanism must be capable of continuous operation.

These requirements are fully met by the construction of the present invention. The piercing needles 132 are made relatively rigid and sturdy to pierce the web 26, and the yarn 153 is fed axially through these piercing needles. The loop-forming needles 147 gather the necessary yarn for forming the loops, and push the yarn through the web after it has been pierced by the piercing needles 132.

According to the present invention, the needle assembly 34 is mounted upon a steadily moving carriage with the result that as long as the web 26 is pierced by either the piercing or the loop-forming needles it is stretched and pushed along in front of the needles, as indicated, for example, in Figs. 12 and 13. The amount of stretch in the web 26 will vary according to whether the needles are working near the edges of the web where it is rigidly held by the jaw assemblies 52 and 54 or near the center. Unless the vertical needle travel is properly adjusted, this difference in stretch may result in uneven loop heights and uneven tension on the yarn between successive loops. To minimize the effects of variations in stretch of the web and to obtain optimum uniformity of operation, the needles are preferably adjusted so that the loop-forming needles 147 complete gathering of the yarn necessary to form a complete loop before the piercing needles 132 pierce the web. This requires that the loop-forming needles 147 complete their up stroke by the time the piercing needles 132 enter the web.

A second requirement for optimum operation and to make rugs of maximum uniformity is that the piercing needles 132 must be withdrawn from the web 26 by the time the loop-forming needles 147 reach the bottom of their stroke and before they begin their upward travel. If the loop-forming needles 147 begin their up stroke while the piercing needles 132 are still in the web 26, the web is prevented from closing about and gripping the looped yarn, and no means are readily available to hold the loops in place while the loop-forming needles 147 are withdrawn. When, on the other hand, the piercing needles 132 are withdrawn from the web simultaneously with, or prior to the start of the loop-forming needles' up stroke, the web, being elastic, closes about the loops and holds them in place with relatively little slippage while the loop-forming needles 147 are withdrawn.

In the herein described embodiments of the invention, these two requirements are satisfied and optimum rug looping is provided by placing the web 26 at the mid-stroke of the piercing needles 132 so that the tips 156 of the piercing needles travel equal distances above and below the web 26 as shown in Figs. 10-13. The needles are driven with the required relative motions by the two eccentrics on the drive wheel 102, the looping needles 147 trailing the piercing needles 132 by 90°. This 90° angular displacement in travel between the piercing and looping needles, although critical for optimum results may be varied within reasonable limits, the permissible variation being greater in the direction of increasing the angular displacement. It is difficult to set precise limits for varying the displacement angle since many factors enter into the picture such as, for example, the nature of the web 26 and the yarn 153, the size of the yarn relative to the size of the piercing needles, the number of strands of the yarn, the speed of operation of the machine, and both the spacings and the heights of the loops.

Figure 14:
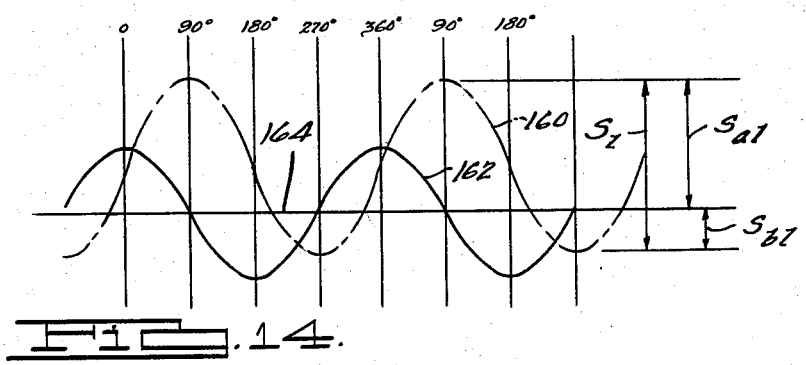
Fig. 14 is a chart describing the vertical travel of the loop-inserting needles during operation of the machine.

The length of stroke of the piercing needles 132 is not critical in the practice of the invention and may be set at any desired distance. It is only important that the piercing needles 132 travel sufficiently far so that they pierce the web 26 cleanly on the down stroke and clear it completely on the up stroke. The length of travel of the looping needles 147 affects only the height of the loop to be formed. The chart shown in Fig. 14 illustrates diagrammatically the optimum timing relationship between the travel of the loop-forming and the piercing needle tips as a function of rotation of the drive wheel 102. The travel of the loop-forming needles 147 is indicated by the dashed line 160, and the travel of the piercing needles 132 is indicated by the solid line 162. It will be noted that although the piercing needles travel symmetrically above and below the web 26, which is indicated by the horizontal axis 164, the loop-forming needles 147 require more travel above the web 26 than below it in order to gather sufficient yarn for the loops.

The proportional dimensions of the various parts of the needle assembly for optimum operation may be generalized as follows, the two eccentrics 116 and 118 being 90° apart on the drive wheel 102.

The travel, or instantaneous positions of the tips of the piercing and the loop-forming needles 132 and 147, respectively, with respect to their uppermost positions, as a function of the rotation of the drive wheel 102 may be expressed as:

$$T_p = R_p - R_p \cos \theta - L_{rp}\sqrt{L_{rp}^2 - (R_p \sin \theta)^2} \quad (1)$$
$$T_1 = R_1 - R_1 \cos(\theta - 90°) - L_{r1}$$
$$-\sqrt{L_{r1}^2 - (R_1 \sin[\theta - 90°])^2} \quad (2)$$

where:

$T_p$ = travel of the piercing needles 132.
$T_1$ = travel of the loop-forming needles 147.
$R_p$ = radial displacement of the piercing needle eccentric 118 from the center of the drive wheel 102.
$R_1$ = radial displacement of the loop-forming needle eccentric 116 from the center of the drive wheel 102.
$\theta$ = angular displacement of the drive wheel 102 from a starting position in which the piercing needle eccentric 118 is directly over the center 166 of the drive wheel.
$L_{rp}$ = length of the piercing needle yoke 128 taken from the center of the piercing needle eccentric 118 to the pivot point 169 connecting the piercing needles to the yoke.
$L_{r1}$ = length of the loop-forming needle yoke 126, taken analogously to $L_{rp}$.

The length of the piercing needles 132 is:

$$L_{np} = H_c - \sqrt{L_{rp}^2 - R_p^2} \quad (3)$$

where:

$H_c$ = height of the center of the drive wheel 102 above the web 26.

Thus the tips 156 of the piercing needles are at the level of the web 26 when the drive wheel 102 is at its 90° position, the piercing needle eccentric 118 being level with the center of the drive wheel.

The total stroke, $S_1$, of the loop-forming needles 147, may be regarded as having two constituents, one portion, $S_{a1}$, being above the web 26, and the other portion, $S_{b1}$, being below the web 26. The portion above the web, $$S_{a1} = \sqrt{L_y^2 - D_1^2} \quad (4)$$

where:

$L_y$ = the length of yarn gathered by the loop-forming needles 147 for each successive loop; and
$D_1$ = the spacing between successively formed loops.

The length of the loop-forming needles 147 including the sleeves 130 on which they are mounted, i.e., the distance from the tips of the loop-forming needles 147 to the pivot center 171 at the lower end of the loop-forming needle yoke, is:

$$L_{n1} = H_c + R_1 - L_{r1} - S_{a1} \quad (5)$$

The length of yarn gathered on each upward stroke of the loop-forming needles 147 is given approximately by $$L_y = D_1 + S_{b1} \quad (6)$$

and the height of the loop 167 is approximately equal to, but usually slightly less than the lower portion, $S_{b1}$, of the stroke of the loop-forming needles 147. In practice, the elasticity of the yarn and slippage tend to make the loop 167 somewhat shorter than the length of the lower portion, $S_{b1}$, of the loop-forming needle stroke. The yarn 153 tends to stretch while it is being gathered and may slip slightly back out of the web 26 during the up stroke of the loop-forming needles. Then, either the newly formed loop 167 springs back slightly when the loop-forming needle is withdrawn from the backing, or the preceding loop is pulled back a little when the needle reaches the bottom of its stroke. The net effect is not objectionable, however, because it may be easily compensated for by adjusting the radial spacing of the loop-forming needle eccentric 116 on the drive wheel 102.

The relative positions of the drive wheel 102 and of the piercing and loop-forming needles at different successive stages of one cycle of their operation are shown in Figs. 10 and 10A to 13 and 13A. Fig. 10 illustrates the relative positions of the piercing needles 132 and the loop-forming needles 147 at an arbitrarily selected starting point in the cycle when the piercing needles 132 are at the uppermost point of their stroke. This starting point corresponds to the 0° position in Fig. 14. At this time, the loop-forming needles 147 are slightly above the midpoint of their up stroke. Fig. 10A illustrates the position of the drive wheel 102 at the point in the cycle when the needles are as shown in Fig. 10. The center of the drive wheel 102 is indicated at 166. The center of the eccentric boss 118 that drives the piercing needles 132 is shown at 168, and the center of the eccentric boss 116 that drives the loop-forming needles 147 is indicated at 170. Both the piercing needles 132 and the loop-forming needles 147 are clear of the web 26 at this time.

Figs. 11 and 11A illustrate the positions of the needles and of the drive wheel 102 when the drive wheel has rotated counterclockwise 90° from the position indicated in Figs. 10 and 10A. The piercing needles 132 are at the midpoint of their down stroke and are just entering the web 26. The loop-forming needles 147 are at the uppermost point of their stroke and have gathered a sufficient amount of the yarn 153 to form the next succeeding loop.

Figs. 12 and 12A illustrate the positions of the respective parts after the drive wheel 102 has rotated a further 90°. The piercing needles 132 are now at the bottom of their down stroke, and the loop-forming needles 147 are at the midpoint of their down stroke. The relative positions of the tips of the respective needles may be seen also in Fig. 14 along the vertical line indicated at 180°.

During the vertical travel of the needles, the entire needle assembly 34 is travelling longitudinally along the ways 30, to the right as viewed in Figs. 10–13, and when the piercing needles 132 enter the web 26, they stretch the web to the left of the needle and produce slight wrinkles 165 in advance, or to the right of the needles due to this travel.

In the fourth position illustrated in Figs. 13 and 13A and corresponding to the angular position of 270° shown in Fig. 14, the piercing needles 132 are at the midpoint of their up stroke, just clearing the web 26. The loop-forming needles 147 are at the bottom of their down stroke and have formed a yarn loop 167 on the lower side of the web 26. The web 26 being released by the piercing needles 137 has started to snap back from its stretched position, and the wrinkles 165 are flattening out. As the web 26 snaps back, it contracts around and grips the yarn 153 to hold the loop 167 firmly in position during retraction of the loop-forming needles 147.

The spacings between successive ones of the loops 167 shown in Figs. 10–13 are exaggerated for clarity. In practice, the loop spacing may be varied as desired according to the type of carpet to be produced and the nature of the web 26. For example, the proportions may be as shown in Figs. 15 and 16 wherein there is illustrated a fragment 131 of a typical looped carpet made on a machine according to the invention. The loops 167 are preferably anchored on the reverse side of the web 26 by a cement 133 such as a rubber latex or other compound, and some or all of the loops 167 may be sheared to provide a pile effect, if desired, according to conventional practice.

Modified reversing mechanism

According to a second embodiment of the invention, a fluid motor is provided for reversing the direction of drive of the carriage, and for reversing the needle orientation. This arrangement is illustratively shown in Figs. 17–20 mounted upon a rug-looping carriage assembly 32' which is similar in all respects, except for the reversing mechanism, to the carriage assembly 32 shown in Fig. 5. The carriage drive reversing bar 112 and the needle orientation reversing rack 154 are both driven by a fluid motor 210 mounted upon a bracket, or stanchion 212 fixed at one end of the carriage 32'. The fluid motor 210 is conventionally arranged for bi-directional drive and may be controlled as hereinafter described through an electrically actuatable four-way valve V317 mounted adjacent to it on the stanchion 212. The movable piston rod 216 of the fluid motor 210 is vertically oriented and carries a rack 218 which engages a pinion 220 fixed upon a transversely extending shaft 222. This shaft 222 is rotatably mounted in fixed position in the body 90 of the carriage 32'. The pinion 220 engages an upwardly facing rack 224, which is secured to the needle reversing rack 154. Vertical reciprocation of the piston driven rack 218 rotates the pinion 220 and drives the rack 224 and the needle reversing rack 154 back and forth longitudinally. The piston driven rack 218 an the rack 224 both engage the same pinion 220 and therefore their travels are equal and the throw of the fluid motor 210 is made just long enough to accomplish full reversal of the needle assembly 34.

The driving power of the fluid motor 210 is transmitted also to the carriage drive reversing bar 112 by an arm 230 fixed upon the shaft 222 and depending radially therefrom toward and beyond the carriage drive reversing bar 112. The arm 230 is downwardly bifurcated to define a slot 232 to receive a driving lug 234. This lug 234 is adjustably fixed in a bar 236 that is welded or otherwise rigidly secured to the reversing bar 112 and extends downwardly therefrom. Rotation of the shaft 222 swings the arm 230 and drives the bar 236, together with the reversing bar 112 back and forth to reverse the drive gear assembly 104. The amount of travel of the reversing bar 112 can be readily adjusted by changing the position of the lug 234 from one to another of the apertures 240 in which it may be secured in the bar 236.

Actuation of the fluid motor 210 may be controlled by any desired limit switch arrangement responsive to the approach of the carriage 32' to within predetermined distances of the ends of the ways 30.

Control system

One illustrative control system of an electro-pneumatic character for controlling the operation of the entire rug-looping machine including a carriage similar to the carriage 32' is illustrated in Fig. 21. This system includes a plurality of electrical solenoids associated with different respective pneumatic valves which control the operation of the various pneumatic cylinders in the machine. All of the solenoids may be powered from a single source of electrical power such as a conventional 110 volt, 60 cycle alternating current source and the voltage may be adjusted by an input transformer 300, one output terminal of which is connected to a point of reference potential hereinafter referred to as ground. A fluid under pressure such as compressed air may be supplied from any convenient source (not shown) and is introduced into the system through an inlet conduit 310 which is connected through the various valves to actuate the pneumatic cylinders of the machine as hereinafter described.

The operation of the control circuit is responsive to the action of six normally open, single throw limit switches S301 to S306. The first three of these switches S301, S302 and S303 as shown in Fig. 3 are fixedly mounted near the center of the machine, and are actuatable by trip members, or cams 250, 252 and 254 mounted upon the carriage 32 or 32'. The physical positions of the second three switches S304, S305 and S306 are not shown in the drawings. They are mounted on the carriage and are actuated by trip members or cams (not shown) fixed on the stop members 73.

As indicated in Fig. 3, two of the limit switch trip members 250 and 252 are aligned with the first limit switch S301 so that on each traverse of the carriage 32 or 32' this limit switch S301 is actuated twice. Further details of the control system will become apparent from the following description of the operation thereof.

The electric drive motor 28 is ordinarily energized continuously during operation of the apparatus, and may be controlled through a separate line switch (not shown).

In operation of the machine, as the carriage 32' approaches the center of the ways 30, and assuming the direction of travel is from right to left as viewed in Figs. 2 and 3, the initial action is tripping of the limit switch S301 by the leading trip member 250. This produces no operational effect since the valves V312 and V314, which are energized by the switch S301 are already in the positions they assume when the switch S301 is now actuated.

The next step is the actuation of the second limit switch S302 by the trip member 254. Actuation of this limit switch S302 reverses the positions of four of the valves, namely, V312, V314, V316 and V318. The first two of these valves V312 and V314 are four-way valves and control the action of the jaw assemblies 52 at the ends of the table 22, the action at both ends of the table being symmetrical. First, the clamping cylinders 86 are retracted to raise the plates 78 from the base plates 60 to release the web 26. The pneumatic circuit is arranged and the sizes of the various cylinders are selected so that the clamping cylinders 86 are the first to operate in response to shifting of the valves V312 and V314. Next, the tension cylinders 74 are extended to advance the jaw assemblies 52 and 54 towards each other, and compressed air is introduced through check valves 332 to the conduits 328 leading to the shifting cylinders 69 to extend them to drive the jaw assemblies 52 and 54 backwards with respect to the travel of the web 26.

The conduit 324 serves as an exhaust for the shifting cylinder 69 at this time, being vented to atmosphere through the valve V316. The valve V318 is closed to prevent escape of compressed air from the conduit 328 through the conduit 340.

After the switch S302 has been released and the above-described action completed, the switch S301 is actuated by the second trip member 252 aligned with it. Actuation of the switch S301 now reverses the position of the two four-way valves V312 and V314, reestablishing the positions illustrated in Fig. 21. The conduits 322 are now pressurized, and the conduits 320 are vented to atmosphere. The clamping cylinders 86 are extended to drive the plates 78 towards the base plates 60, again to grip the web 26. And the tension cylinders 74 are retracted to draw the jaw assemblies 52 and 54 apart, again to place the web 26 under positive tension. The shifting cylinders 69 remain in their extended positions.

Next, the switch S303 is actuated by the trip member 254. The sole function of the switch S303 is to operate the valve V334 to retract the fabric advance cylinder 51 in readiness for the next advance of the web 26. This completes the action of the control system accomplished when the carriage 32 or 32' is at the midpoint of its travel along the ways 30.

The actuating sequence for operation of the jaw assemblies 52 and 54 requires that the switch S301 must be actuated after the switch S302. This is insured in the present structure by the provision of two trip members 250 and 252 spaced along the carriage, both aligned to actuate the switch S301. Thus, regardless of the direction of approach of the carriage to the switches, the switch S301 is actuated subsequently to S302. It is also actuated before S302, but as hereinabove explained this first actuation of the switch S301 produces no operative effect.

When the carriage 32' reaches the end of its travel on the ways 30, two of the limit switches carried by it are actuated. These two switches are S304 and either S305 or S306, depending on which end of the ways 30 the carriage 32' is approaching. These switches S305 and S306 control the four-way valve V317 to reverse the reversing cylinder 210. The switch S304 actuates the valves V316, V334 and V318 to energize the shifting cylinders 69 and the fabric advance cylinder 51 to advance the web 26. The valve V318 is shifted to the right to vent the conduit 340 to atmosphere. The valve V316 is shifted to the right (back to its position as shown) to pressurize the conduit 324 to retract the shifting cylinders 69 and to extend the fabric advance cylinder 51. The valve V334 is shifted to the right (back to its position as shown) to vent the conduit 338 to atmosphere. The shifting cylinders 69 drive the jaw assemblies 52 and 54 forward synchronously with the web 26, keeping the web constantly under tension and properly aligned.

During this action, the shifting cylinders 69 and the fabric advance cylinder 51 are exhausted through the conduit 340 and the exhaust valve V318, since air discharged from these cylinders is blocked by the check valves 332 from access to the exhaust port of the valves V312 and V314.

Although the control system shown in Fig. 21 is electro-pneumatic, it may be readily converted to an electro-hydraulic system by the substitution of hydraulic valves in place of the pneumatic valves shown, and by joining all the exhaust ports to a common manifold system leading to a hydraulic reservoir. Further, the invention is not limited to the specific type of control system described herein, but may be practiced in conjunction with other control systems adapted to operate the various parts of the machine according to the described sequence.

What is claimed is:

1. Machine for looping rugs comprising an elongated table defining a longitudinal slot, means to tension a rug backing fabric upon said table over said slot, ways fixedly supported above said table and extending generally parallel with said slot, a carriage mounted on said ways for reciprocating longitudinal travel therealong, means to drive said carriage back and forth along said ways, a rug looping needle assembly mounted on said carriage in alignment with said slot, means to drive said assembly in timed relationship to the travel of said carriage, and means to orient said needle assembly in the direction of travel of said carriage so that said needle assembly is operative to form loops in the backing fabric during travel of the carriage in either direction.

2. Machine for looping rugs comprising an elongated table defining a longitudinal slot, means to tension a rug backing fabric upon said table over said slot, ways fixedly supported above said table and extending generally parallel with said slot, a carriage mounted on said ways for longitudinal travel therealong, means to drive said carriage back and forth along said ways, a rug looping needle assembly mounted on said carriage in alignment with said slot, and means to drive said assembly in timed relationship to the travel of said carriage, said tensioning means including gripping jaws disposed at opposite ends of said table and adapted to grip a fabric, means to advance and retract said jaws toward and away from each other, means to open and close said jaws to release and to grip a fabric, and control means responsive to the travel of said carriage to actuate said opening and closing means and said advancing and retracting means in a predetermined timed sequence.

3. Machine for looping rugs comprising an elongated table defining a longitudinal slot, means to tension a rug backing fabric upon said table over said slot, ways fixedly supported above said table and extending generally parallel with said slot, a carriage mounted on said ways for longitudinal travel therealong, means to drive said carriage back and forth along said ways, a rug looping needle assembly mounted on said carriage in alignment with said slot, and means to drive said assembly in timed relationship to the travel of said carriage, said tensioning means including gripping jaws disposed at opposite ends of said table and adapted to grip a fabric, means to advance and retract said jaws toward and away from each other longitudinally along the length of said table, means to reciprocate said jaws transversely across said table, means to open and close said jaws to release and to grip a fabric, and jaw control means responsive to the travel of said carriage to actuate said advancing and retracting means, said reciprocating means, and said opening and closing means in a predetermined time sequence.

4. Machine for looping rugs comprising an elongated table defining a longitudinal slot, means to tension a rug backing fabric upon said table over said slot, ways fixedly supported above said table and extending generally parallel with said slot, a carriage mounted on said ways for longitudinal travel therealong, means to drive said carriage back and forth along said ways, a rug looping needle assembly mounted on said carriage in alignment with said slot, and means to drive said assembly in timed relationship to the travel of said carriage, said tensioning means including gripping jaws disposed at opposite ends of said table and adapted to grip a fabric, means to advance and retract said jaws toward and away from each other longitudinally along the length of said table, means to reciprocate said jaws transversely across said table, means to open and close said jaws to release and to grip a fabric, control means responsive to the travel of said carriage to actuate said reciprocating means to move said jaws in one transverse direction when the direction of travel of said carriage is reversed, control means to move said jaws in the opposite transverse direction when said jaws are opened, and control means responsive to the travel of said carriage to actuate said advancing and retracting means and said opening and closing means when said carriage travels past a preselected intermediate point along said ways, said last-named control means being operative first to effect opening of said jaws, then to advance said jaws towards each other, then to close said jaws, and lastly to retract said jaws away from each other.

5. Machine for forming rug pile loops in a backing web comprising an elongated table defining a longitudinal slot, means to tension a rug backing web upon said table over said slot, ways fixed above said table and extending generally parallel to said slot, a carriage mounted on said ways for longitudinal travel therealong, means to drive said carriage back and forth along said ways, a rug-looping needle assembly mounted on said carriage in alignment with said slot, said assembly including a rotatable wheel having two angularly and radially spaced eccentric bosses fixed thereon, a pair of hollow piercing needles vertically mounted in and extending through a horizontal disc-shaped plate, the rim of said plate being of double convex curvature, said plate being rotatably supported within a collar the inner surface of which is shaped to fittingly receive the rim of said disc, said collar being connected to one of said bosses for reciprocating vertical drive thereby, a pair of yarn-looping needles drivingly connected to a second horizontal disc-shaped plate, the rim of said second plate being of double convex curvature, said second plate being rotatably supported within a second collar the inner surface of which is shaped to fittingly receive the rim of said second disc, said second collar being connected to the other one of said bosses for reciprocating drive thereby, and guide means cooperative with said piercing needles for holding them in preselected alignment with respect to said carriage.

6. Machine for forming rug pile loops in a backing web comprising an elongated table defining a longitudinal slot, means to tension a rug backing web upon said table over said slot, ways fixed above said table and extending generally parallel to said slot, a carriage mounted on said ways for longitudinal travel therealong, means to drive said carriage back and forth along said ways, a rug-looping needle assembly mounted on said carriage in alignment with said slot, said assembly including a rotatable wheel having two angularly and radially spaced eccentric bosses fixed thereon, a pair of hollow piercing needles vertically mounted in and extending through a horizontal disc-shaped plate, the rim of said plate being of double convex curvature, said plate being rotatably supported within a collar the inner surface of which is shaped to fittingly receive the rim of said disc, said collar being connected to one of said bosses for reciprocating vertical drive thereby, a pair of yarn-looping needles drivingly connected to a second horizontal disc-shaped plate, the rim of said second plate being of double convex curvature, said second plate being rotatably supported within a second collar the inner surface of which is shaped to fittingly receive the rim of said second disc, said second collar being connected to the other one of said bosses for reciprocating drive thereby, rotatable guide means for holding said needles in preselected alignment with respect to said carriage, and means to rotate said guide means to controllably change the alignment of said needles with respect to said carriage from one preselected orientation to another preselected orientation.

7. Rug looping apparatus including a needle assembly, comprising a first disc, a plurality of parallel tubular piercing needles fixed to and extending through said disc, a second disc axially aligned with and spaced from said first disc, a plurality of yarn-looping needles fixedly connected to said second disc, each one of said yarn-looping needles being longitudinally movable with respect to and having an end portion extending within a separate one of said piercing needles, the rims of said discs being of double convex curvature, said discs being rotatably supported in slip collars having inner races shaped to conform to said rims, said collars being supported on separate yokes, a double eccentric wheel drivingly connected to said yokes to reciprocate said needles both with respect to a fixed reference point and to each other, guide means to guide said needles for travel along a straight longitudinal path, said guide means being effective to align said needles in a predetermined direction, and means to rotate said needles about a common axis parallel to the longitudinal axes of said piercing needles.

8. Machine for forming rug pile loops in a backing web comprising an elongated table defining a longitudinal slot, means to tension a rug backing web upon said table over said slot, ways mounted upon said table in alignment with said slot, a carriage mounted on said ways for reciprocating longitudinal travel therealong, a rug-looping needle assembly mounted on said carriage and including a rotatable wheel having two angularly spaced eccentric bosses fixed thereon, a pair of tubular piercing needles connected to one of said bosses for reciprocating vertical drive thereby, a pair of yarn-looping needles connected to the other one of said bosses for reciprocating vertical drive thereby, said needles being connected to said bosses through connecting means permitting angular rotation of said needles through an angle perpendicular to the face of said wheel, a guide member adapted to hold said needles in a preselected angular position relative to the axis of said wheel, and means to drive said guide member angularly to rotate said needles about a common axis parallel to the face of said wheel.

9. Rug looping apparatus comprising a first disc, a pair of tubular piercing needles fixed upon and extending through said first disc, a second disc axially aligned with and spaced from said first disc, a pair of yarn-looping needles fixedly connected to said second disc and having end portions extending within said piercing needles, the rims of said discs being of double convex curvature, said discs being rotatably supported in slip collars having inner races shaped to conform to said rims, separate yokes fixed separately to said collars, a wheel having two angularly spaced eccentric bosses arranged to drive said yokes to reciprocate said needles in timed relationship, said eccentric bosses being connected to different respective ones of said yokes, and guide means to guide said needles along a straight longitudinal path during operation of said apparatus.

10. Rug looping apparatus comprising a first disc, a pair of tubular piercing needles fixed upon and extending through said first disc, a second disc axially aligned with and spaced from said first disc, a pair of yarn-looping needles fixedly connected to said second disc and having end portions extending within said piercing needles, the rims of said discs being of double convex curvature, said discs being rotatably supported in slip collars having inner races shaped to conform to said rims, separate yokes fixed separately to said collars, a wheel having two angularly spaced eccentric bosses arranged to drive said yokes to reciprocate said needles in timed relationship, said eccentric bosses being connected to different respective ones of said yokes, and guide means to guide said needles along a straight longitudinal path during operation of said apparatus, said guide means including a member slidably fitted around said needles in fixed angular relationship thereto, and means to rotate said member to rotate said needles about an axis parallel to the face of said wheel.

11. Rug looping apparatus comprising a tubular piercing needle, a yarn-looping needle having a yarn engaging end extending within said piercing needle, said yarn-looping needle being longitudinally reciprocable with respect to said piercing needle, a double eccentric wheel drivingly connected to said needles for reciprocating them both with respect to the axis of said wheel and with respect to each other, the driving connection between said wheel and said needles being such that the total travel of said yarn-looping needle is greater than the total travel of said piercing needle, and the center of travel of said looping needle end portion is closer to the axis of said wheel than the center of travel of the tip of said piercing needle.

12. Rug looping apparatus comprising an elongated table defining a slot and adapted to support a rug backing web spanning said slot, ways fixedly mounted with respect to said table in alignment with said slot, a carriage mounted on said ways for reciprocating travel therealong, a double eccentric wheel mounted on said carriage for rotation about a horizontal axis, means for driving said wheel in one angular direction about said axis, the two eccentrics of said wheel being 90° displaced one from the other with respect to said axis, a tubular piercing needle drivingly connected to the angularly leading one of said eccentrics for reciprocating vertical drive thereby, a yarn-looping needle having a yarn engaging end portion extending within said piercing needle drivingly connected to the angularly following one of the said eccentrics for reciprocating vertical drive thereby, said piercing needle being arranged so that the center of the reciprocating travel of its tip is substantially at the level of a web supported on said table across said slot, said yarn-looping needle being arranged so that the center of the reciprocating travel of its end portion is spaced from the web toward said wheel, the travel of both of said needles extending through the web.

13. Rug looping apparatus comprising a tubular piercing needle, a yarn-looping needle having a yarn engaging end portion extending within said piercing needle, means to reciprocate said needles with respect both to each other and to a fixed backing web, means to support said needles in operative relationship to a fixed backing web, said reciprocating means being arranged to drive said piercing needle through a path intersecting the web so that the tip of said piercing needle describes a path substantially centered with respect to the plane of the web, said reciprocating means further being arranged to drive said yarn-looping needle through a path generally parallel to the path of said piercing needle, the travel of said yarn engaging end portion being centered about a point spaced from the web, the travel of said piercing needle being 90° advanced in time with respect to the travel of said yarn-looping needle.

14. Rug looping apparatus comprising a disc having a spherically curved rim, a needle mounted on said disc substantially in axial alignment therewith, a slip collar having an inner race shaped to conform to said rim and supportingly fitted thereon, means for reciprocating said collar through a path generally parallel to the axis of said disc, guide means adapted to hold said needle in a predetermined axial alignment with respect to a fixed reference point and at a preselected angular position relative thereto, and means cooperative with said guide means for controllably rotating said needle and said disc with respect to said collar.

15. Rug looping apparatus comprising a wheel having two angularly spaced eccentric bosses fixed thereon, means to drive said wheel in rotation about its axis, a pair of slip collars connected separately to said bosses for reciprocating longitudinal drive thereby when said wheel is rotated, a first disc rim-supported within one of said slot collars, a pair of tubular piercing needles fixed upon and extending through said first disc, a second disc axially aligned with and spaced from said first disc and rim-supported within the other one of said collars, a pair of yarn-looping needles fixedly connected to said second disc and including end portions extending within said piercing needles, the rims of said discs being of double convex curvature and the inner circumferential surfaces of said slip collars being shaped to conform closely to said rims so that said discs are securely held within said collars and are rotatable therein in all angular directions, guide means to guide said needles along a straight longitudinal path during operation of said apparatus, and means cooperative with said guide means for rotating said needles about a common axis.

16. Rug looping apparatus comprising an elongated table defining a longitudinal slot, means to tension a rug backing web upon said table over said slot, ways fixed above said table and aligned with said slot, a carriage mounted on said ways for longitudinal travel therealong, means to drive said carriage back and forth along said ways, a rug-looping needle assembly including a rotatable wheel having two angularly spaced eccentric bosses fixed thereon, means to drive said wheel in rotation, a pair of slip collars drivingly connected to separate ones of said bosses for vertical reciprocating drive when said wheel is rotated, a pair of needle mounting discs separately supported in said slip collars, the rims of said discs being of double convex curvature and the inner circumferential surfaces of said collars being shaped to conform closely to the rims of said discs so that said discs are securely mounted within said collars for longitudinal vertical drive thereby yet are rotatable with respect to said collars in all angular directions, a pair of hollow piercing needles vertically mounted in and extending through one of said discs, a pair of yarn-looping needles fixedly connected to the other one of said discs and having end portions extending within said piercing needles, a guide member slidably fitted around said needles in fixed angular relationship thereto, and means responsive to the travel of said carriage for rotating said member to rotate said needles about a vertical axis when the direction of travel of said carriage is reversed.

17. Rug looping apparatus comprising an elongated table defining a longitudinal slot, means to tension a rug backing web upon said table over said slot, ways fixed above said table and aligned with said slot, a carriage mounted on said ways for longitudinal travel therealong, means to drive said carriage back and forth along said ways, a rug-looping needle assembly including a rotatable wheel having two angularly spaced eccentric bosses fixed thereon, means to drive said wheel in rotation, a pair of slip collars drivingly connected to separate ones of said bosses for vertical reciprocating drive when said wheel is rotated, a pair of needle mounting discs separately supported in said slip collars, the rims of said discs being of double convex curvature and the inner circumferential surfaces of said collars being shaped to conform closely to the rims of said discs so that said discs are securely mounted within said collars for longitudinal vertical drive thereby yet are rotatable with respect to said collars in all angular directions, a pair of hollow piercing needles vertically mounted in and extending through one of said discs, a pair of yarn-looping needles fixedly connected to the other one of said discs and having end portions extending within said piercing needles, a guide member slidably fitted around said needles in fixed angular relationship thereto, a gear mounted exteriorly upon said guide member, a rack slidably mounted on said carriage in engagement with said gear, said rack being longer than said carriage and extending beyond one end thereof in the direction of travel thereof, releasable latch means to fix said rack in position with respect to said carriage, spring means fixed with respect to said ways and including an abutment member aligned with said rack, said spring means being adapted to receive and store energy from said carriage when said rack is driven against said abutment member, a cam fixed with respect to said ways in alignment with said latch means and positioned to release said latch means after said rack has been driven against said abutment member to permit said spring means to release energy stored therein to drive said rack longitudinally in said carriage to rotate said needles.

18. Rug looping apparatus comprising an elongated table defining a longitudinal slot, means to tension a rug backing web upon said table over said slot, ways fixed above said table and aligned with said slot, a carriage mounted on said ways for longitudinal travel therealong, means to drive said carriage back and forth along said ways, a rug-looping needle assembly including a rotatable wheel having two angularly spaced eccentric bosses fixed thereon, means to drive said wheel in rotation, a pair of slip collars drivingly connected to separate ones of said bosses for vertical reciprocating drive when said wheel is rotated, a pair of needle mounting discs separately supported in said slip collars, the rims of said discs being of double convex curvature and the inner circumferential surfaces of said collars being shaped to conform closely to the rims of said discs so that said discs are securely mounted within said collars for longitudinal vertical drive thereby yet are rotatable with respect to said collars in all angular directions, a pair of hollow piercing needles vertically mounted in and extending through one of said discs, a pair of yarn-looping needles fixedly connected to the other one of said discs and having end portions extending within said piercing needles, a guide member slidably fitted around said needles in fixed angular relationship thereto, and means responsive to the travel of said carriage for rotating said member to rotate said needles about a vertical axis when the direction of travel of said carriage is reversed, said means for rotating said member including a fluid cylinder mounted on said carriage and drivingly connected to said guide member, and electric control means to actuate said cylinder in response to the travel of said carriage.

19. Means for forming rug pile loops in a backing web comprising an elongated table defining a longitudinal slot, means for tensioning a rug backing web upon said table over said slot, advancing means to advance said web across said slot, ways fixedly mounted above said table in alignment with said slot, a carriage mounted on said ways for reciprocating longitudinal travel therealong, a rug-looping needle assembly mounted on said carriage in alignment with said slot, drive means adapted for continuous operating for driving said carriage continuously back and forth along said ways and for continuously driving said needle assembly in vertical reciprocation, positioning means cooperable with said needle assembly for holding said needle assembly selectively in one of two predetermined angular positions with respect to said carriage, and control means responsive to the travel of said carriage for intermittently energizing said advancing means and said positioning means to advance said web a predetermined distance and to reverse the angular position of said needle assembly with respect to said carriage when the direction of travel of said carriage is reversed.

20. Machine for forming rug pile loops in a backing web comprising an elongated table defining a longitudinal slot, tension means including a pair of clamping jaw assemblies for tensioning a rug backing web upon said table longitudinally with respect thereto, each one of said assemblies including fluid cylinders adapted to open and close a pair of web-gripping jaws and to drive said assemblies longitudinally and transversely with respect to said table, said machine also including ways mounted above said table over said slot, a carriage mounted on said ways for reciprocating longitudinal travel therealong, a rug-looping needle assembly mounted on said carriage in alignment with said slot and adapted to be reciprocatingly driven to insert rug pile loops in a web tensioned over said slot, means to drive said carriage continuously back and forth along said ways, means to continuously reciprocate said needle assembly, positioning means to align said needle assembly with respect to said carriage, a fluid cylinder cooperable with said positioning means to reverse the alignment of said needle assembly, and control means responsive to the travel of said carriage to actuate all of said fluid cylinders in a predetermined timed sequence.

21. Rug looping apparatus comprising a needle, a guide member for holding said needle in a predetermined axial alignment and guiding it for smooth translational travel in the direction of its long axis, said guide member being rotatable about an axis parallel to the long axis of the needle and being coupled to said needle for rotating it, and drive means including a universal connection for translatably reciprocating said needle in the direction of its long axis.

22. Rug looping machine comprising a table for supporting a rug backing web, means for intermittently driving a rug backing web across said table and for tensioning the web in its direction of travel, means for alternately releasing and gripping the web at opposite points along its edges for tensioning it in a direction transverse to its travel, and means for actuating said releasing and gripping means in predetermined timed relationship with said driving means.

References Cited in the file of this patent

UNITED STATES PATENTS

| | | |
|---|---|---|
| 1,883,599 | Dahlen | Oct. 18, 1932 |
| 2,177,514 | Benson | Oct. 24, 1939 |
| 2,365,013 | Sharkey et al. | Dec. 12, 1944 |
| 2,528,392 | Self | Oct. 31, 1950 |
| 2,533,420 | Blumfield | Dec. 12, 1950 |
| 2,564,631 | Veitch | Aug. 14, 1951 |
| 2,595,585 | Kline | May 6, 1952 |
| 2,600,993 | Kline et al. | June 17, 1952 |
| 2,604,860 | Farber | July 29, 1952 |
| 2,656,803 | Montgomery | Oct. 27, 1953 |
| 2,682,841 | McCutchen | July 6, 1954 |